(12) United States Patent
Lee

(10) Patent No.: US 7,668,045 B2
(45) Date of Patent: Feb. 23, 2010

(54) ULTRASONIC DISTANCE MEASUREMENT METHOD AND DEVICE BY EXTRACTING THE PERIOD OF A RECEIVED SIGNAL FROM NOISE USING A DUAL-THRESHOLD COMPARATOR

(75) Inventor: Dong Hwal Lee, LG Metrocity 2cha Apt., 133-901, Yongho 1-dong, Nam-gu, Busan 608-890 (KR)

(73) Assignees: Dong Hwal Lee, Busan (KR); KT Corporation, Sungnam-Si (KR)

( * ) Notice: Subject to any disclaimer, the term of this patent is extended or adjusted under 35 U.S.C. 154(b) by 265 days.

(21) Appl. No.: 10/597,295

(22) PCT Filed: Jan. 18, 2005

(86) PCT No.: PCT/KR2005/000165
§ 371 (c)(1),
(2), (4) Date: Jul. 19, 2006

(87) PCT Pub. No.: WO2005/083463
PCT Pub. Date: Sep. 9, 2005

(65) Prior Publication Data
US 2008/0192573 A1   Aug. 14, 2008

(30) Foreign Application Priority Data
Jan. 19, 2004   (KR) .............. 10-2004-0003664

(51) Int. Cl.
*G01S 15/08* (2006.01)

(52) U.S. Cl. .................................... 367/98

(58) Field of Classification Search ............ 367/98, 367/100–116, 118–130, 128; 342/107, 109–112, 342/118–146; 73/490, 597
See application file for complete search history.

(56) References Cited

U.S. PATENT DOCUMENTS

| | | | | |
|---|---|---|---|---|
| 3,896,411 A * | 7/1975 | Mackey et al. | ............... | 367/98 |
| 4,376,990 A * | 3/1983 | Metchev | ............... | 367/95 |
| 4,428,237 A | 1/1984 | Zeger et al. | | |
| 4,644,513 A * | 2/1987 | Czajkowski | ............... | 367/98 |
| 4,974,214 A * | 11/1990 | Forster et al. | ............... | 367/98 |
| 5,150,334 A * | 9/1992 | Crosby | ............... | 367/98 |
| 6,556,511 B1 * | 4/2003 | Welke | ............... | 367/98 |
| 2008/0192573 A1 * | 8/2008 | An et al. | ............... | 367/99 |

FOREIGN PATENT DOCUMENTS

| | | |
|---|---|---|
| EP | 1347365 | 9/2003 |
| WO | WO 98/26309 | 6/1998 |
| WO | WO 2005083463 A1 * | 9/2005 |

* cited by examiner

*Primary Examiner*—Dan Pihulic
(74) *Attorney, Agent, or Firm*—Knobbe, Martens, Olson & Bear LLP

(57) ABSTRACT

The present application discloses a method of and an apparatus for measuring a distance using an ultrasonic wave. The method of measuring a distance using an ultrasonic wave includes the steps of receiving through an ultrasonic sensor a signal from an ultrasonic transmitter; amplifying the received signal; filtering a high-frequency component from the amplified signal, thereby generating a filtered signal; generating an output signal when the filtered signal satisfies a predetermined condition; and computing a distance based on a period of the output signal.

9 Claims, 3 Drawing Sheets

[Fig. 1]
[Prior Art]
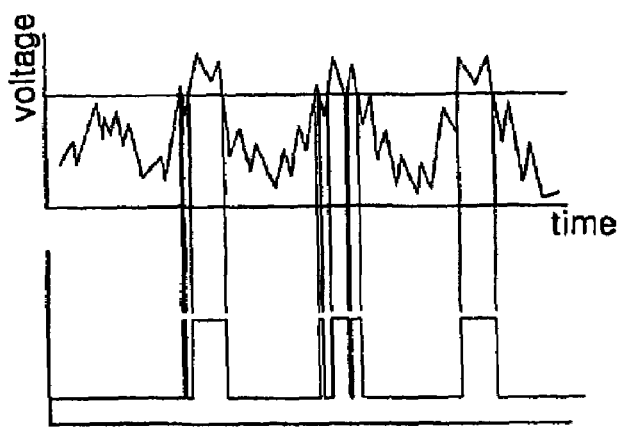
[Fig. 2]
[Prior Art]
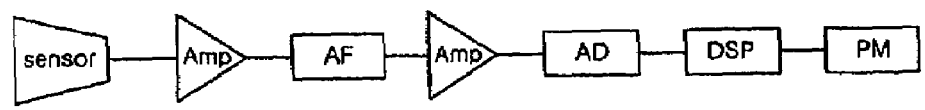
[Fig. 3]
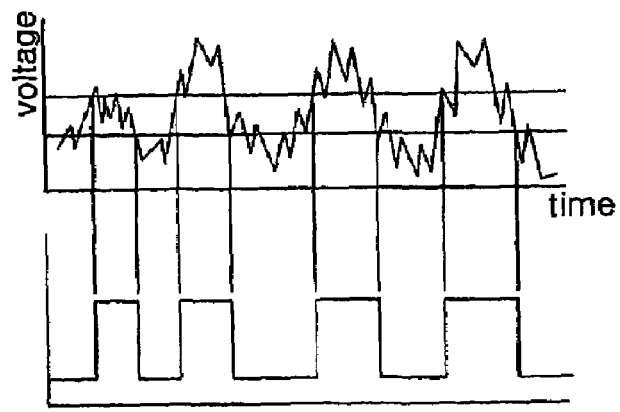

[Fig. 4]
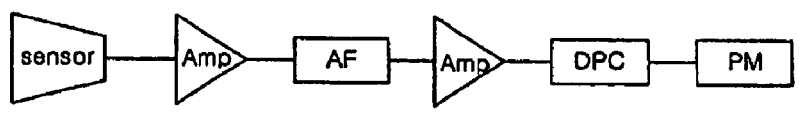
[Fig. 5]
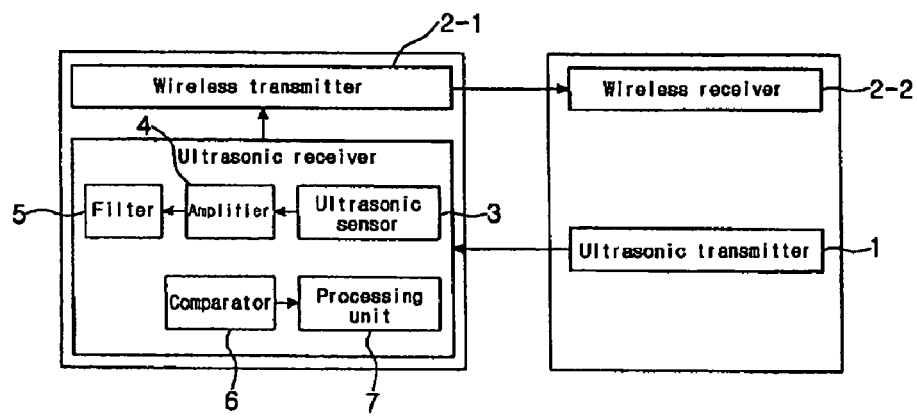
[Fig. 6]
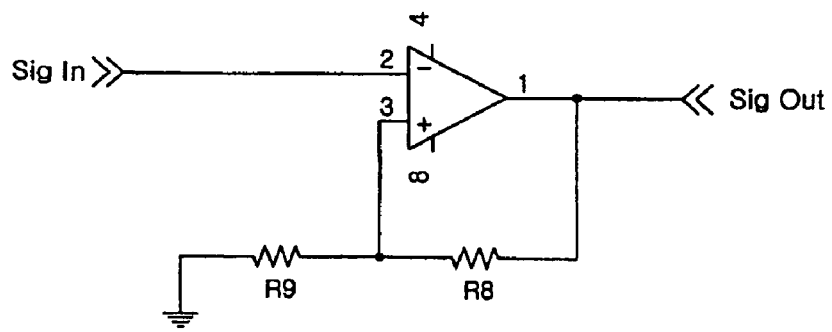

[Fig. 7]
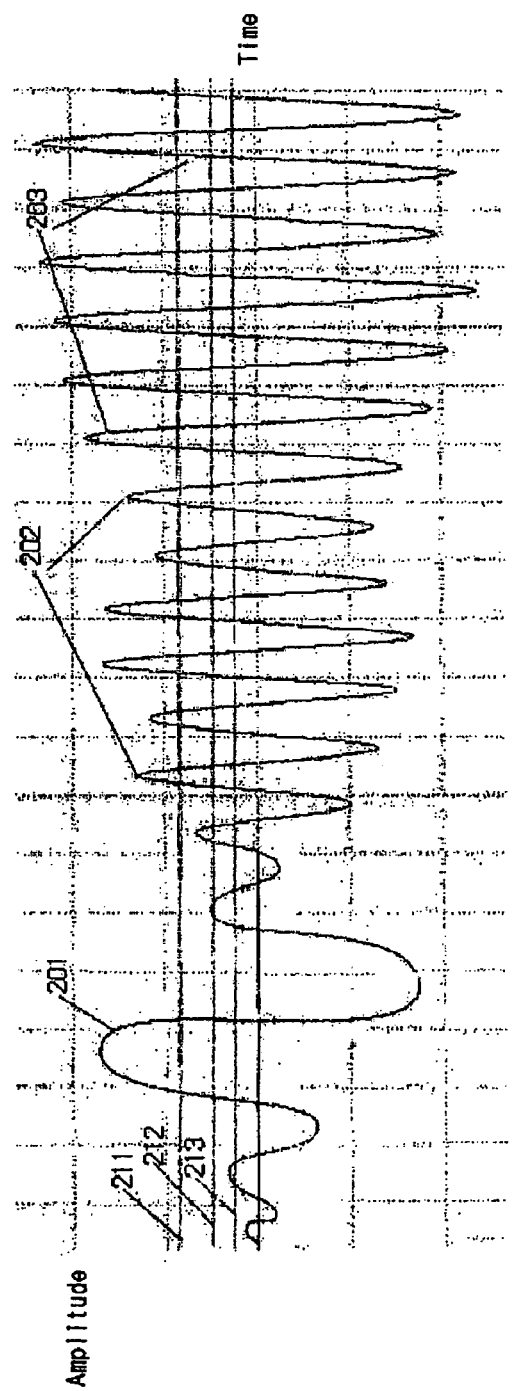

ULTRASONIC DISTANCE MEASUREMENT METHOD AND DEVICE BY EXTRACTING THE PERIOD OF A RECEIVED SIGNAL FROM NOISE USING A DUAL-THRESHOLD COMPARATOR

TECHNICAL FIELD

The present invention relates to a method of and an apparatus for measuring a distance using an ultrasonic wave. More specifically, the invention relates to such method and apparatus, in which an ultrasonic signal is transmitted and detected to measure a distance, thereby applying it to various range finder, a lateral positioning device, a factory automation, a mobile robot, a pseudo satellite, or the like.

BACKGROUND ART

FIG. 1 is a graph showing a conventional distance measuring method, which decides according the signal size whether a signal is arrived. One example of this type of method is a method of measuring distance using ultrasonic waves, which is disclosed in U.S. Pat. No. 5,197,019 (Delon-Martin, et al.). However, this technique has a problem in that it may be mal-operated in response to a large noise. That is, this technique uses a variable gain in order to maintain constantly the shape of signals. A time-domain signal is transformed into a frequency-domain signal, which is again transformed into a time-domain signal after being digital-processed, so that a high-performance computer is required, thereby lacking practicality. It can be seen from FIG. 1 that this method responds easily to noise. Therefore, with this conventional method, the size of signal cannot be amplified above the noise.

In order to solve these problems, the present inventor has proposed a distance measurement method and device using ultrasonic waves, which is disclosed in PCT application No. PCT/KR/2004/001917

As shown in FIG. 2, the above distance measuring method and apparatus is designed to measure a distance using an analogue-digital converter (AD), a digital signal processor (DSP), and a period measurement. That is, in the previous technique of the present inventor using ultrasonic waves to measure a distance, a received ultrasonic signal is adequately amplified, and a natural frequency is separated from the ultrasonic signal mixed with undesired signal and transformed into a digital signal, so that the arrived signal of initial pulse can be extracted, thereby enabling the calculation of target distance in a stable fashion, as compared with any other conventional one.

DISCLOSURE OF INVENTION

Technical Problem

As described above, in the previous application, the present inventor has proposed a technique, which can be applied to various industries by measuring a distance more effectively and stably using an ultrasonic wave, as compared with a conventional method of calculating using a signal size or using a threshold level detection.

The above-proposed technique has a high precision. However, it has a limitation in manufacturing a relatively inexpensive product, in order to apply universally to all the industries, not only to the precision industry. That is, in the previous technique, a received ultrasonic signal is converted into a digital signal, and thus AD and DSP are employed in order to calculate an accurate distance, thereby increasing the manufacturing cost thereof.

Therefore, the present invention has been made in order to solve the above problems occurring in the prior art, and it is an object of the invention to provide a novel method of and an apparatus for measuring a distance using an ultrasonic wave, which can be effectively controlled, relatively to the conventional one (the prior technique by the present inventor), although the precision thereof is slightly lower than the conventional technique.

Technical Solution

In order to accomplish the above object, according to one aspect of the invention, there is provided a method of measuring a distance using an ultrasonic wave. The method of the invention comprises steps of: receiving through an ultrasonic sensor a signal generated from an ultrasonic transmitter according to a signal of ultrasonic transmission time; amplifying the received signal; filtering a high-frequency wave from the amplified signal; outputting only a signal corresponding to a predetermined signal size from the signal in which the high-frequency wave is filtered; and computing a distance value by calculating the period of the output signal.

The predetermined signal size may be composed of an upper limit and a lower limit, and a signal between the upper limit and the lower limit can be configured so as not to be outputted.

The step of amplifying the received signal may carry out amplification in such a way that a noise except for an ultrasonic signal is unsaturated.

According to another aspect of the invention, there is provided a method of measuring a distance using an ultrasonic wave. The method of the invention comprises steps of: transmitting a signal of ultrasonic transmission time to an ultrasonic transmitter through at least one of wired and wireless modes; receiving through an ultrasonic sensor a signal generated from the ultrasonic transmitter according to the signal of ultrasonic transmission time; amplifying the received signal; filtering a high-frequency wave from the amplified signal; storing the time when the filtered signal intersects the values of a predetermined signal size; and determining as an arrived signal a signal in which a difference between the preceding and following values of the stored time continuously occurs repeatedly over a certain number of times within an error of pre-determined time; and converting the time difference between the signal of ultrasonic transmission time and the arrived signal into a measured distance.

According to another aspect of the invention, there is provided an apparatus for measuring a distance using an ultrasonic wave. The apparatus comprises: an ultrasonic transmitter for transmitting an ultrasonic wave; a means for transmitting a synchronized signal in a wired or wireless mode in order to transmit an ultrasonic transmission signal; an ultrasonic sensor for receiving the ultrasonic signal transmitted from the ultrasonic transmitter; an amplifier for amplifying the ultrasonic signal received by the ultrasonic sensor; a filter for filtering a high-frequency signal from the amplified signal of the amplifier; a comparator for outputting only a signal corresponding to a predetermined signal size from the filtered signal; and an arithmetic unit for computing a distance value by calculating the period of the output signal.

The comparator may have a predetermined signal size composed of an upper limit and a lower limit and is configured so as not to output a signal between the upper limit and the lower limit.

The method of and the apparatus for measuring a distance using an ultrasonic wave are made applying a method and an apparatus, which has been proposed in the previous application of the present applicant. The processing steps are simplified using various steps of comparison modes, thereby reducing the cost and providing easy applications. In addition, a period, with which a signal meeting various conditional sizes is repeated, is measured, so that a noise having a different period, but having a large size of signal, is removed to thereby measure a distance.

According to the distance measuring method and device using an ultrasonic wave of the invention, the distance measurement can be performed using a received ultrasonic signal without any separate digital processing. Accordingly, as compared with the conventional techniques including one proposed in the previous application filed by the present applicant, a relatively inexpensive product having a simple construction can be provided, thereby applying to various fields, which do not need a high precision control. In addition, the distance measuring method and device employs a distance computation method through the period measurement, which has been proposed by the present applicant, and thus an accurate distance calculation can be achieved, while being less affected by noise, as compared with conventional ones.

Advantageous Effects

As described above, according to the distance measuring method and device using an ultrasonic wave of the invention, the distance measurement can be performed using a received ultrasonic signal without any separate digital processing. Accordingly, as compared with the conventional techniques including one proposed in the previous application filed by the present applicant, a relatively inexpensive product having a simple construction can be provided, thereby applying to various fields, which do not need a high precision control. In addition, the distance measuring method and device employs a distance computation method through the period measurement, which has been proposed by the present applicant, and thus an accurate distance calculation can be achieved, while being less affected by noise, as compared with conventional ones.

While the present invention has been described with reference to the particular illustrative embodiments, it is not to be restricted by the embodiments but only by the appended claims. It is to be appreciated that those skilled in the art can change or modify the embodiments without departing from the technical concept of the present invention.

For example, in the preferred embodiment of the invention, for the sake of convenience, a transmission call signal is mentioned with respect to a synchronized signal, but an opposite transmission may be performed using the same function. That is, the ultrasonic transmitter 1 may transmit an ultrasonic wave and a signal of the transmission time may be transmitted wirelessly, instead that the ultrasonic transmitter 1 transmits an ultrasonic wave in response to the transmission call signal.

BRIEF DESCRIPTION OF THE DRAWINGS

Further objects and advantages of the invention can be more fully understood from the following detailed description taken in conjunction with the accompanying drawings, in which:

FIG. 1 is a graph showing a conventional distance measuring method using an ultrasonic wave;

FIG. 2 is a block diagram explaining the processing procedures of a received signal in the distance measuring method and device using an ultrasonic wave, which is proposed in the previous application by the present inventor;

FIG. 3 is a graph showing a distance measuring method using an ultrasonic wave according to the present invention;

FIG. 4 is a block diagram illustrating the processing procedures of a received signal in the method and apparatus according to the invention;

FIG. 5 is a block diagram explaining a distance measuring apparatus using an ultrasonic wave according to one preferred embodiment of the invention;

FIG. 6 illustrates one example of the comparator circuit in the distance measuring apparatus of FIG. 5; and FIG. 7 is a graph comparing signal detection by a distance measuring method and apparatus according to the present invention and the conventional technique.

BEST MODE FOR CARRYING OUT THE INVENTION

The preferred embodiments of the present invention will be hereafter described in detail with reference to the accompanying drawings.

FIG. 3 is a graph showing a distance measuring method using an ultrasonic wave according to the present invention. FIG. 4 is a block diagram illustrating the processing procedures of a received signal in the method and apparatus according to the invention.

Referring to FIGS. 1 and 3, the conventional technique and the method according to the invention are compared. First, as shown in FIG. 1, the conventional one determines according to the signal size whether or not a signal is arrived, and thus mal-operation due to noise must be considered. Therefore, the amplification of signal is limited in order for the noise not to become adequately large.

According to the present invention, however, when the input signal passes upward from below the upper limit, the output signal ascends, and when the input signal passes downward from above the lower limit, the output signal descends, as illustrated in FIG. 3. In addition, in the case where the input signal passes upward from below the lower limit, if the output signal does not ascend, the output signal does not descent even when the input signal passes downward from above the upper limit. Therefore, the output signal does not change, until the input signal passes downward from above the lower limit and the output signal descends, after the input signal passes upward from below the upper limit and the output signal ascends.

Similarly, the output signal does not change, until the input signal passes upwards from below the upper limit and the output signal ascends, after the input signal passes downwards from above the lower limit and the output signal descends.

Referring to FIGS. 2 and 4, the present invention is compared with the conventional technique, which is proposed by the present inventor through the previous application. As shown in FIG. 2, the above conventional technique need essentially AD and DSP for digital-processing in the signal processing procedures. Such devices require a high-performance such as a high-speed operation. In the distance measuring method and apparatus using an ultrasonic wave according to the invention, however, a comparator is employed, instead of AD and DSP, as illustrated in FIG. 4. A signal processed by this comparator is exemplified in FIG. 3. In this way, according to the present invention, two sizes are set up in the comparator 6, and the size change between the two does not affect the outputting of signals. Therefore, the method and apparatus according to the invention determines the presence of noise by measuring the period of output, and thus is not affected by noise.

Mode For The Invention

A preferred embodiment of the invention will be described, referring to FIGS. 5 to 7, where like components performing like functions are denoted by the same reference number. On the other hand, the common method and device for measuring a distance using an ultrasonic wave, and the method and apparatus proposed by the present applicant in the previous application are readily understood by those skilled in the art, and thus details and illustration thereof will be omitted or briefly explained here. That is, the description focuses on details related to the present invention.

FIG. 5 is a block diagram explaining a distance measuring apparatus using an ultrasonic wave according to one preferred embodiment of the invention. FIG. 6 illustrates one example of the comparison circuit in the distance measuring apparatus of FIG. 5. FIG. 7 is a graph comparing signal detection by a distance measuring method and apparatus according to the present invention and the conventional technique.

Referring to FIGS. 5 and 6, in the distance measuring method and apparatus using an ultrasonic wave according to one preferred embodiment of the invention, an ultrasonic wave having various periods is transmitted. An ultrasonic transmission signal is received wiredly or wireless and the ultrasonic wave is received. The signal is adequately amplified and a high-frequency signal is filtered. The time when the signal intersects an upper limit and a lower limit of the pre-determined signal size is stored. It is determined that a signal in which a difference between the preceding and following values of the stored time continuously occurs repeated over a certain number of times within an error of pre-determined time is an arrived signal, and the time difference between the signal of ultrasonic transmission time and the arrived signal is converted into a measured distance.

In addition, a distance measuring device using ultrasonic wave according to one embodiment of the invention an ultrasonic transmitter 1 for transmitting ultrasonic wave, a device 2 for transmitting a wired or wireless synchronized signal in order to transmit an ultrasonic transmitter signal, a ultrasonic sensor 3 for receiving a high-frequency signal, an amplifier 4 for amplifying the above signals adequately, a filter 5 for filtering the high-frequency signal, and an arithmetic unit 6 for processing the time when the signal changes its polarity to thereby converting into a measured distance.

The operation of the method and device according to the invention will be described. First, the device 2 for transmitting the synchronized signal is composed of a wireless transmitter 2-1 and a wireless receiver 2-2, and an ultrasonic transmission call signal is transmitted wirelessly through this device.

According to the above transmission call signal, the ultrasonic transmitter 1 transmits ultrasonic waves. The ultrasonic signal reaches the ultrasonic sensor 3 after passing a medium transmitting a sonic wave for a certain period of time, which corresponds to the transmitted distance.

The signal received by the ultrasonic sensor 3 includes a noisy signal, along with the targeted ultrasonic signal. In addition, there exists a noise in the circuit. This noise has a common magnitude, and abruptly a large magnitude of noise can happen.

The amplifier 4 amplifies the above noise to the extent not to be saturated. At this time, the high-frequency signal may be saturated. This amplification method cannot be used in the conventional method of measuring the maximum amplitude, but can be applied to the present invention.

Furthermore, the filter 5 removes undesired high-frequency components. An example of a signal passing through the filter is illustrated in FIG. 7.

The comparator 6 carries out a determination as to the present of a signal with respect to a predetermined magnitude of signal. As shown in FIG. 7, the comparator 6 of the invention can provide a two-step setting up of an upper limit 211 and a lower limit 212. With respect to a signal between the above two steps, a comparing signal is not output. The signal passing through the comparator 6 presents the period of a high-frequency signal. The comparator 6 according to one preferred embodiment of the invention is constructed in the manner as illustrated in FIG. 6. A signal processed by the comparator 6 of the invention is exemplified in FIG. 3. In this way, in this embodiment, the comparator establishes two sizes, and the size variation in-between does not affect the output of a signal. Therefore, according to the method and device of the invention, since the presence of noise is determined by measuring the frequency (period) of an output, it is not affected by the noise.

The arithmetic unit 7 functions to calculate the above period and then to compute a distance value with respect to a signal, without responding to noise. As illustrated in FIG. 7, a high-frequency signal 203 exhibits a certain period continuously. A similar signal 202 changes its period to above a certain size. In this way, the arithmetic unit 7 does not respond to a signal, which does not maintain its period continuously.

Commonly, noise has various periods. The period thereof is in common below a certain size, but a larger noise 201 may happen to occur. In the conventional method shown in FIG. 7, the size of a signal is utilized as the decision criteria. Therefore, in the case where the standard size are established smaller, it responds to a small noise 213. In the case where the standard size are larger, it responds to a large noise. In the method and device according to the invention, however, the decision is made by measuring a period, and thus it does not respond to these small and large noises 201.

INDUSTRIAL APPLICABILITY

As described above, according to the distance measuring method and device using an ultrasonic wave of the invention, the distance measurement can be performed using a received ultrasonic signal without any separate digital processing. Accordingly, as compared with the conventional techniques including one proposed in the previous application filed by the present applicant, a relatively inexpensive product having a simple construction can be provided, thereby applying to various fields, which do not need a high precision control. In addition, the distance measuring method and device employs a distance computation method through the period measurement, which has been proposed by the present applicant, and thus an accurate distance calculation can be achieved, while being less affected by noise, as compared with conventional ones.

While the present invention has been described with reference to the particular illustrative embodiments, it is not to be restricted by the embodiments but only by the appended claims. It is to be appreciated that those skilled in the art can change or modify the embodiments without departing from the technical concept of the present invention.

For example, in the preferred embodiment of the invention, for the sake of convenience, a transmission call signal is mentioned with respect to a synchronized signal, but an opposite transmission may be performed using the same function.

That is, the ultrasonic transmitter 1 may transmit an ultrasonic wave and a signal of the transmission time may be transmitted wirelessly, instead that the ultrasonic transmitter 1 transmits an ultrasonic wave in response to the transmission call signal.

The invention claimed is:

1. A method of measuring a distance using an ultrasonic wave, the method comprising steps of:
    receiving through an ultrasonic sensor a signal from an ultrasonic transmitter;
    amplifying the received signal;
    filtering a high-frequency component from the amplified signal, thereby generating a filtered signal;
    generating an output signal when the filtered signal satisfies a predetermined condition; and
    computing a distance based on a period of the output signal,
    wherein generating the output signal comprises:
        comparing the filtered signal against an upper threshold and a lower threshold so as to provide the output signal, wherein the output signal has a lower level and an upper level;
        wherein the output signal transitions from the lower level to the upper level when the filtered signal changes from below the upper threshold to above the upper threshold, and the output signal stays at the upper level when the filtered signal maintains above the lower threshold, and
        wherein the output signal transitions from the upper level to the lower level when the filtered signal changes from above the lower threshold to below the lower threshold, and the output signal stays at the lower level when the filtered signal maintains below the upper threshold.

2. The method according to claim 1, wherein the step of amplifying the received signal carries out amplification in such a way that a noise except for an ultrasonic signal is unsaturated.

3. An apparatus for measuring a distance using an ultrasonic wave, the apparatus comprising:
    an ultrasonic transmitter configured to transmit an ultrasonic wave;
    a transmitter configured to transmit a synchronized signal in a cable or wireless mode in order to transmit an ultrasonic transmission signal;
    an ultrasonic sensor configured to receive the ultrasonic signal transmitted from the ultrasonic transmitter;
    an amplifier configured to amplify the ultrasonic signal received by the ultrasonic sensor;
    a filter configured to filter a high-frequency signal from the amplified signal of the amplifier, thereby generating a filtered signal;
    a comparator configured to output an output signal when the filtered signal has a predetermined condition; and
    a processing unit configured to compute a distance value based on a period of the output signal,
    wherein the comparator compares the filtered signal against an upper threshold and a lower threshold so as to provide the output signal, wherein the output signal has a lower level and an upper level,
    wherein the output signal transitions from the lower level to the upper level when the filtered signal changes from below the upper threshold to above the upper threshold, and the output signal stays at the upper level while the filtered signal maintains above the lower threshold; and
    wherein the output signal transitions from the upper level to the lower level when the filtered signal changes from above the lower threshold to below the lower threshold, and the output signal stays at the lower level while the filtered signal maintains below the upper threshold.

4. The apparatus according to claim 3, wherein the processing unit includes:
    a first unit configured to monitor the output signal, which comprises a plurality of pulses; and
    a second unit configured to determine that an expected ultrasonic signal has arrived when at least predetermined number of pulses having a substantially similar width are identified; and
    a third unit configured to convert a time difference between ultrasonic transmission time of the signal received from the ultrasonic transmitter and an arrival time of the expected ultrasonic signal into a measured distance.

5. The apparatus according to claim 3, wherein the output signal comprises a plurality of pulses, each of the pulses having a rising edge and a falling edge, and wherein the period of the output signal is a duration from the rising edge of one of the pulses to the rising edge of an immediately following one of the pulses.

6. The method according to claim 1, further comprising steps of:
    monitoring the output signal, which comprises a plurality of pulses; and
    determining that an expected ultrasonic signal has arrived when at least predetermined number of pulses having a substantially similar width are identified; and
    converting a time difference between ultrasonic transmission time of the signal received from the ultrasonic transmitter and an arrival time of the expected ultrasonic signal into a measured distance.

7. The method according to claim 1, wherein the output signal comprises a plurality of pulses, each of the pulses having a rising edge and a falling edge, and wherein the period of the output signal is a duration from the rising edge of one of the pulses to the rising edge of an immediately following one of the pulses.

8. A method of determining arrival of an ultrasonic wave, the method comprising:
    receiving a signal through an ultrasonic sensor;
    filtering a high-frequency component from the signal, thereby generating a filtered signal; and
    comparing the filtered signal against a first threshold and a second threshold so as to provide an output signal having a first level and a second level different from the first level, the second threshold being lower than the first threshold,
        wherein the output signal transitions from the first level to the second level when the filtered signal changes from below the first threshold to above the first threshold, and the output signal stays at the second level when the filtered signal maintains above the second threshold, and
        wherein the output signal transitions from the second level to the first level when the filtered signal changes from above the second threshold to below the second threshold, and the output signal stays at the first level when the filtered signal maintains below the first threshold.

9. The method according to claim 8, further comprising:
    monitoring the output signal, which comprises a plurality of pulses; and
    determining that an expected ultrasonic signal has arrived when at least predetermined number of pulses having a substantially similar width are identified.

* * * * *

UNITED STATES PATENT AND TRADEMARK OFFICE
CERTIFICATE OF CORRECTION

PATENT NO. : 7,668,045 B2  Page 1 of 1
APPLICATION NO. : 10/597295
DATED : February 23, 2010
INVENTOR(S) : Dong Hwal Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 484 days.

Signed and Sealed this

Twenty-eighth Day of December, 2010

David J. Kappos
*Director of the United States Patent and Trademark Office*